United States Patent
Hepburn et al.

Patent Number: 5,837,212
Date of Patent: *Nov. 17, 1998

[54] POTASSIUM/MANGANESE NITROGEN OXIDE TRAPS FOR LEAN-BURN ENGINE OPERATION

[75] Inventors: Jeffrey Scott Hepburn, Dearborn; Eva Thanasiu, Trenton, both of Mich.; William Lewis Henderson Watkins, Toledo, Ohio; Carolyn Parks Hubbard, Dearborn Heights, Mich.; Douglas A. Dobson, Livonia, Mich.; Haren Sakarlal Gandhi, Farmington Hills, Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 531,502

[22] Filed: Sep. 21, 1995

[51] Int. Cl.⁶ .................................................. B01D 53/56
[52] U.S. Cl. .................................. 423/213.2; 423/239.1
[58] Field of Search ................... 502/324, 525; 423/239.1, 213.2

[56] References Cited

U.S. PATENT DOCUMENTS

| | | | |
|---|---|---|---|
| 3,388,077 | 6/1968 | Hoekstra | 502/328 |
| 3,804,902 | 4/1974 | Sakakibara et al. | 502/324 |
| 4,369,132 | 1/1983 | Kinoshita | 502/261 |
| 4,497,783 | 2/1985 | Barber | 423/213.5 |
| 4,621,071 | 11/1986 | Blanchard | 502/302 |
| 4,629,718 | 12/1986 | Jones et al. | 502/324 |
| 4,769,356 | 9/1988 | Takeuich | 502/242 |
| 5,279,115 | 1/1994 | Inoue | 60/276 |
| 5,388,403 | 2/1995 | Nagami | 60/276 |
| 5,402,641 | 4/1995 | Katoh et al. | 60/285 |
| 5,406,790 | 4/1995 | Hirota | 60/276 |

FOREIGN PATENT DOCUMENTS

| | | |
|---|---|---|
| 0 462 598 A2 | 6/1991 | European Pat. Off. |
| 0573672 A1 | 12/1992 | European Pat. Off. |
| 0562516 A1 | 3/1993 | European Pat. Off. |
| 0580389 | 7/1993 | European Pat. Off. |
| 0582917 A1 | 7/1993 | European Pat. Off. |
| 0589393 A2 | 7/1993 | European Pat. Off. |
| 0613714 A2 | 1/1994 | European Pat. Off. |
| 0 657 204 A1 | 12/1994 | European Pat. Off. |
| 4218060 | 12/1992 | Germany . |
| 52-03567 | 1/1977 | Japan .................. 423/239.1 |
| 53-38710 | 10/1978 | Japan .................. 423/213.2 |
| S61-111127 | 5/1986 | Japan . |
| 63-147518 | 6/1988 | Japan .................. 423/230 |
| HEI4-197447 | 7/1992 | Japan . |
| HEI4-354536 | 12/1992 | Japan . |
| 5-123571 | 5/1993 | Japan . |
| H5-277376 | 10/1993 | Japan . |
| H5-317652 | 12/1993 | Japan . |
| 6-121925 | 6/1994 | Japan .................. 423/239.1 |
| 94-04258 | 3/1994 | WIPO . |

*Primary Examiner*—Michael L. Lewis
*Assistant Examiner*—Peter DiMauro
*Attorney, Agent, or Firm*—Lorraine S. Melotik

[57] ABSTRACT

The invention is a nitrogen oxide trap comprising a porous support; and catalysts consisting of manganese and potassium loaded on the porous support. The trap may be used in an internal combustion engine exhaust gas catalyst system. During lean-burn operation of the engine the trap sorbs nitrogen oxides and releases the nitrogen oxides during decreased oxygen concentration in the exhaust gas.

6 Claims, 1 Drawing Sheet

POTASSIUM/MANGANESE NITROGEN OXIDE TRAPS FOR LEAN-BURN ENGINE OPERATION

FIELD OF THE INVENTION

This invention relates to nitrogen oxide traps employed in the exhaust system of an internal combustion engines to absorb nitrogen oxides during lean-burn operation.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. When the engine is operated in a stoichiometric or slightly rich air/fuel ratio, i.e., between about 14.7 and 14.4, catalysts containing palladium, platinum and rhodium, or palladium and rhodium are able to efficiently convert all three gases simultaneously. Hence, such catalysts are often called "three-way" catalysts. It is desirable to operate the engine in "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of $NO_x$ during lean-burn (excess oxygen) operation.

It has become known that certain alkaline materials like potassium or strontium in combination with platinum are capable of storing or absorbing nitrogen oxides under conditions of excess oxygen. The widely held mechanism for this phenomena is that the platinum first oxidizes NO to $NO_2$ and the $NO_2$ subsequently forms a nitrate complex with the alkaline material. In a stoichiometric or rich environment, the nitrate is thermodynamically unstable, and the stored $NO_x$ is released. $NO_x$ then catalytically reacts with reducing species in the exhaust gas to form $N_2$. These so-called $NO_x$ traps are thus currently receiving considerable attention because they have application for removing $NO_x$ from the exhaust of lean-burn engines.

One of the disadvantages of these $NO_x$ traps is that they employ platinum, a scarce and expensive material. It would be advantageous if an efficient $NO_x$ trap could be devised which would employ a less costly material in place of platinum. We have unexpectedly found that efficient $NO_x$ traps can be made using manganese instead of the platinum when used in combination with potassium.

DISCLOSURE OF THE INVENTION

This invention is directed to an nitrogen oxide ($NO_x$) trap useful to trap nitrogen oxides during the lean-burn of an internal combustion engine. It comprises a porous support loaded with catalysts consisting of manganese and potassium. Preferably, the support is loaded with 2 to 20 weight percent manganese and 5 to 30 weight percent potassium, each based on the weight of the porous support. In another aspect, the invention is an internal combustion engine exhaust gas catalyst system comprising the $NO_x$ trap. The trap is arranged in the exhaust system and absorbs $NO_x$ when the air/fuel ratio of exhaust gas flowing into said trap is lean and releases the absorbed $NO_x$ when the oxygen concentration in the exhaust gas is lowered, as during stoichiometric operation of the engine. Preferably, the manganese is first loaded on the support followed by loading the potassium. According to another aspect, the invention is a process for trapping nitrogen oxides using the disclosed traps.

Advantageously, we have found that platinum in a nitrogen oxide trap can be replaced with manganese when the alkaline material used for nitrogen oxide trapping is potassium and yet retain the trapping efficiency of a more costly platinum/potassium trap. This was unexpected since platinum is widely understood to have the most efficient catalyst for oxidizing NO to $NO_2$. While not wishing to be bound by theory, it is believed that a synergistic interaction results between the potassium and manganese which increases the NO oxidation activity of the manganese. In contrast, a combination of potassium with Fe, Cr (i.e., a chemical element located in the same family of the periodic table and hence considered similar in properties to manganese) did not display the synergistic interaction as did manganese with potassium.

DESCRIPTION OF PREFERRED EMBODIMENTS

Figure 1:
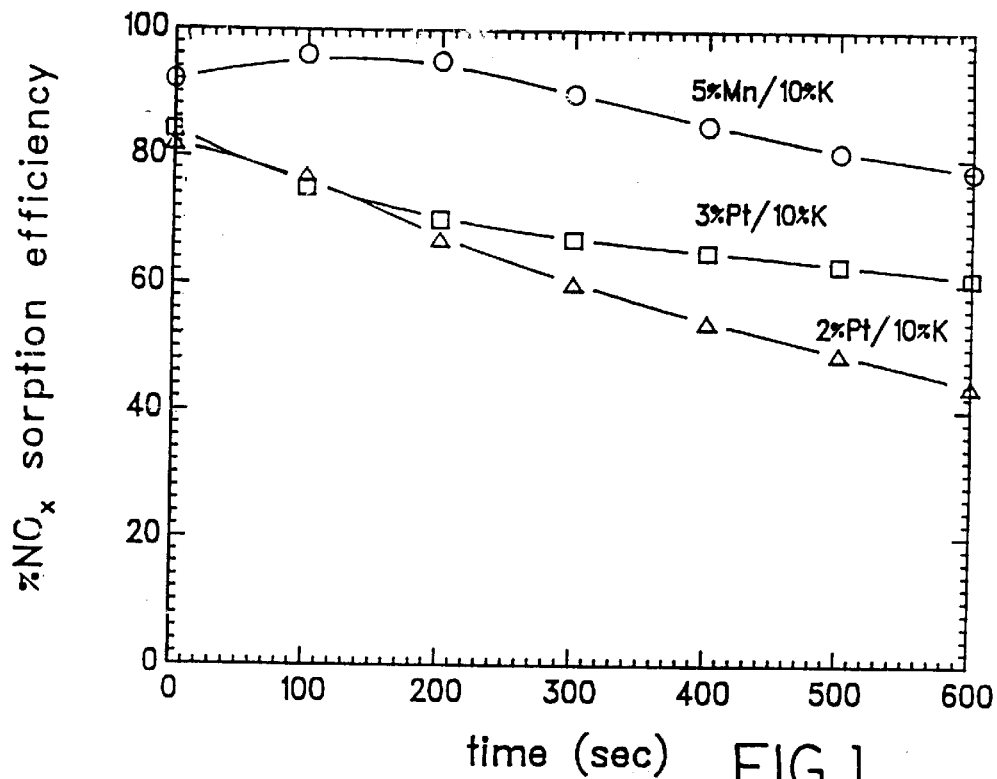
FIG. 1 is a graph showing nitrogen oxide trapping efficiency of two platinum-potassium traps (comparative examples) and a manganese-potassium trap (embodiment of the present invention).

This invention, according to one aspect, is directed to an internal combustion engine exhaust gas catalyst system comprising a nitrogen oxide trap. The $NO_x$ trap comprises a porous support impregnated with manganese and potassium Preferably, the support is loaded with 2 to 20 weight percent manganese and 5 to 30 weight percent potassium, each based on the weight of the porous support. More preferably, the support carries between about 5 and 10 weight percent manganese and between about 15 and 20 weight percent potassium.

The porous support (washcoat) material loaded with the catalysts is preferably a high surface area washcoat material like alumina, preferably being gamma-alumina. Still other washcoat materials which may be used at the high operation temperatures associated with an internal combustion engine exhaust system include, but are not limited to, zeolite, ceria, and zirconia. Such washcoat materials, useful for carrying catalyst materials, are well known to those skilled in the art. The choice of the particular porous support (washcoat) material is not critical to this invention. Desirably, the support material has a surface area between about 5 and 300 $m^2/g$.

For useful application in an exhaust system, the washcoat will be carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

The catalysts and washcoat may be applied to the substrate as a mixture of washcoat and catalyst or in sequential steps in a manner which would be readily apparent to those skilled in the art of catalyst manufacture. Preferably, the washcoat is first applied to the substrate followed by drying and calcination of the washcoat. Then the manganese and potassium catalysts can be deposited on the washcoat, as by incipient wetness techniques well known to those skilled in the art. According to such techniques, the manganese and potassium catalysts, individually or together, would be dissolved as soluble precursors thereof, e.g., as a salt like manganese nitrate, in an aqueous or organic solvent solution which is then impregnated into the washcoat. The particular salt compound employed as well as the solvent therefor is not critical to this invention. Other such materials which may be used would be apparent to those skilled in the art in view of the present disclosure. Drying and calcination of the impregnated washcoat in air generally converts the manganese nitrate to manganese oxide on the washcoat material.

As disclosed above, the trap may be prepared by impregnating the support material with manganese and potassium precursors simultaneously or sequentially. Preferably, the trap is prepared by impregnating the support materials with manganese first followed by impregnation with potassium precursor. As is known in the art, potassium in $NO_x$ traps is susceptible to poisoning by sulfur compounds present in the exhaust gases. The exhaust gases usually contain $SO_2$ which result when from the burning of the fuel which contains sulfur. Over time, the sulfur compounds react with the potassium to form potassium sulfide or potassium sulfate which does not store $NO_x$ and will not revert back to potassium. Thus the potassium, in the presence of such sulfur compounds, loses effectiveness as a trapping material. We have found that by loading the manganese first on the porous support and subsequently loading the potassium on top of the manganese, sulfur poisoning of the potassium is significantly reduced as compared to the reverse order.

The internal combustion engine catalyst system of this invention may include another catalyst device as, for example, a catalytic converter employing a conventional three-way catalyst containing palladium, etc. The three-way catalyst can be placed upstream of the $NO_x$ trap, hence closer to the engine. In such an arrangement, the three-way catalyst being closely mounted to the engine would warm up quickly and provide for efficient engine cold start emission control. Once the engine is warmed up, the three-way catalyst will remove hydrocarbons, carbon monoxide, and nitrogen oxides from the exhaust during stoichiometric operation and hydrocarbons and carbon monoxide during lean operation. The $NO_x$ trap would be positioned downstream of the three-way catalyst where the exhaust gas temperature enables maximum $NO_x$ trap efficiency. During periods of lean engine operation when $NO_x$ passes through the three-way catalyst, $NO_x$ is stored on the trap. The $NO_x$ trap is periodically regenerated by short periods or intervals of slightly rich engine operation. With the $NO_x$ trap positioned downstream of the three-way catalyst in a remote location, it is protected against very high exhaust gas temperatures which could damage it. One may also wish to place a second three-way catalyst downstream of the $NO_x$ trap in order to provide for efficient reduction of the $NO_x$ which desorbs from the trap during regeneration.

EXAMPLE

A nitrogen oxide trap according to an embodiment of the present invention was prepared as follows. Gamma-alumina (100 m2/g) was ball milled and mixed with distilled water to produce a slurry. The slurry was applied to a corderite monolith (400 cells/in$^2$) to obtain a 25 wt. % loading of the alumina. The monolith was subsequently dried at 120° C. to remove the water and calcined in air at 500° C. For 6 hours.

The alumina coated monolith was first impregnated with an aqueous solution containing manganese nitrate adjusted so as to provide for 5 wt. % manganese on the alumina washcoat. Following impregnation with the solution, the alumina was dried at 120° C. for 2 hours to remove the water and then calcined at 500° C. for 6 hours to convert the manganese nitrate to manganese oxide. In a similar fashion, this washcoat was subsequently impregnated with an aqueous potassium nitrate solution (adjusted so as to provide 10 wt. % potassium on the alumina washcoat), dried, and calcined as above to leave potassium on the washcoat.

For comparison, a platinum/potassium nitrogen oxide trap was made by a similar procedure. A monolith coated with calcined alumina was made as disclosed above. The Alumina coated monolith was impregnated with an aqueous solution containing hexachloroplatinic acid. The platinum concentration in the solution was adjusted in order to provide for platinum loadings of 2 and 3 wt. % on the alumina washcoat. Following impregnation of the platinum precursor, the monolith was dried and calcined. The monolith was then impregnated with an aqueous solution containing potassium nitrate. The concentration of the potassium nitrate solution was adjusted in order to provide for a potassium loading of 10 wt. % on the alumina washcoat.

In order to test the $NO_x$ sorption efficiency of the traps, they were subjected to a simulated exhaust gas containing: 600 ppm NO, 10% $CO_2$, 10% $H_2O$, 0.1% CO, 0.03% $H_2$, 50 ppm $C_3H_6$, and 6% $O_2$. The total exhaust gas flow rate was 3 liter/min and the space velocity was 20,000 hr$^{-1}$.

It can be seen from FIG. 1 that replacement of the platinum with manganese provides a $NO_x$ trap with trapping efficiency equivalent to the platinum containing trap. This was unexpected since, as discussed above, manganese is considered to be significantly less effective than platinum for oxidizing NO to $NO_2$. While not wishing to be bound by theory, it is believed that a synergistic interaction results between the potassium and manganese which increases the NO oxidation activity of the manganese. Neither the validity nor understanding of this theory is necessary for the practice of this invention.

Figure 2:
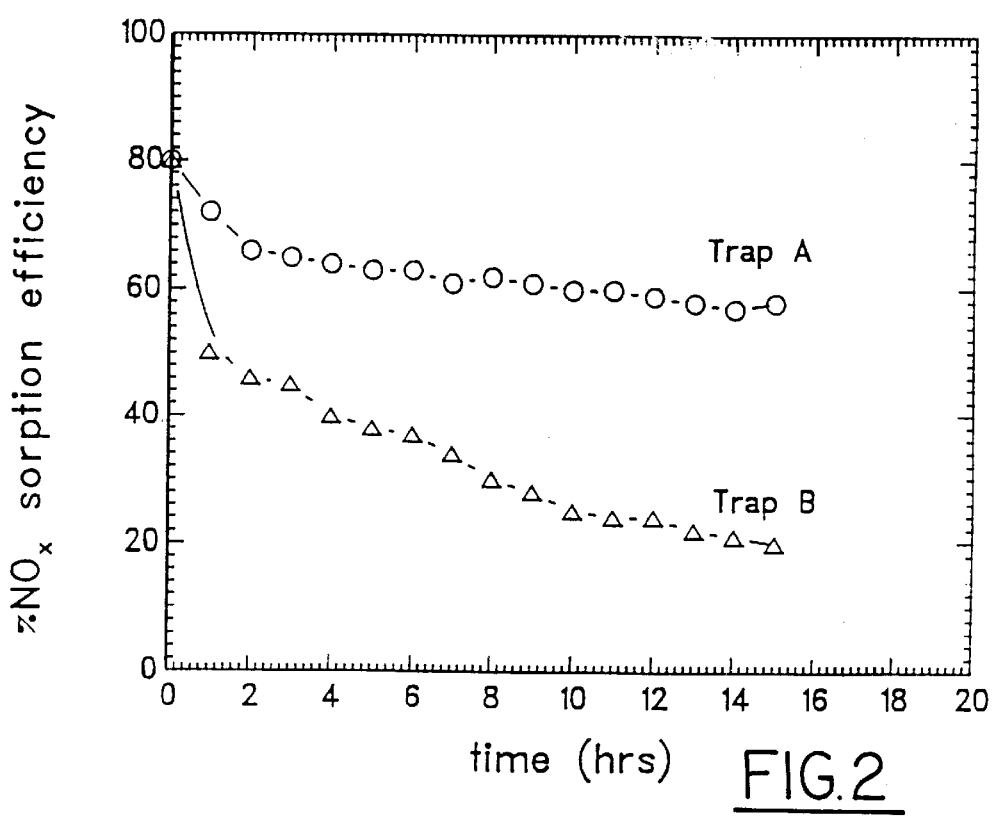
FIG. 2 is a graph showing nitrogen oxide trapping efficiency of two manganese-potassium traps (embodiments of the present invention) during exposure in the test gas containing $SO_2$

FIG. 2 shows the resistance to sulfur poisoning of two trap made according to embodiments of the present invention. More particularly, it shows the advantage of providing the manganese first on the washcoat followed by the potassium in contrast to the reverse loading of the catalysts. Trap A is a washcoat/manganese/ potassium trap like that prepared above, while Trap B is a washcoat/potassium/ manganese trap prepared in reverse order of catalyst impregnation. The traps we subjected to the presence of 20 ppm $SO_2$ in the simulated exhaust gas stream delivered to the traps during testing conducted as described above (5 minute lean cycle). Trap A displays greater resistance to sulfur poisoning than Trap B as seen from FIG. 2. Thus, as concerns sulfur poisoning, the preferred embodiment of the present invention is Trap A where the manganese was loaded first on the porous support, e.g., alumina, followed by the potassium loading.

We claim:

1. A process for trapping and converting nitrogen oxides from the exhaust gases generated during lean-burn operation of an internal combustion engine, said process comprising the steps of:

oxidizing and adsorbing said nitrogen oxides on a nitrogen oxide trap by bringing said oxygen-rich exhaust gases, whose oxygen content is more than that required for oxidizing the components to be oxidized therein, into contact with a nitrogen oxide trap located in an exhaust gas passage of said engine, the trap comprising:

a porous support; and materials consisting essentially of manganese and potassium, wherein one or both of said materials may be present as an oxygen containing compound thereof, loaded on said porous support; and desorbing and reducing said nitrogen oxides by lowering the oxygen concentration of the exhaust gases contacting the trap.

2. The process according to claim 1 wherein manganese is loaded on said support followed by said potassium.

3. The process according to claim 1 wherein said support comprises alumina.

4. The process according to claim 1 wherein said support was loaded with about 2 to 20 wt. percent manganese and 5 to 30 wt. percent potassium, each based on the weight of the porous support.

5. The process according to claim 1 which further comprises the step of contacting said exhaust gases with a three way catalyst positioned upstream of the nitrogen oxide trap.

6. The process according to claim 5 which further comprises a three-way catalyst positioned downstream of the nitrogen oxide trap.

* * * * *